(12) United States Patent
Wilczek

(10) Patent No.: US 9,221,158 B2
(45) Date of Patent: Dec. 29, 2015

(54) POWER SCREWDRIVER OVERLOAD PREVENTION MEANS

(75) Inventor: Klaus Wilczek, Ehningen (DE)

(73) Assignee: LOESOMAT-Schraubtechnik Neef GmbH, Vaihingen/Enz (DE)

( * ) Notice: Subject to any disclaimer, the term of this patent is extended or adjusted under 35 U.S.C. 154(b) by 254 days.

(21) Appl. No.: 14/005,374

(22) PCT Filed: Mar. 16, 2012

(86) PCT No.: PCT/DE2012/000266
§ 371 (c)(1),
(2), (4) Date: Oct. 2, 2013

(87) PCT Pub. No.: WO2012/122971
PCT Pub. Date: Sep. 20, 2012

(65) Prior Publication Data
US 2014/0033882 A1     Feb. 6, 2014

(30) Foreign Application Priority Data

Mar. 17, 2011   (DE) .......................... 10 2011 014 357

(51) Int. Cl.
*B25B 23/14* (2006.01)
*B23P 19/06* (2006.01)
(Continued)

(52) U.S. Cl.
CPC ............. *B25B 23/141* (2013.01); *B23P 19/065* (2013.01); *F16D 7/025* (2013.01); *F16D 7/08* (2013.01)

(58) Field of Classification Search
CPC ... B25B 23/141; B25B 23/1437; F16D 7/025; F16D 7/08
See application file for complete search history.

(56) References Cited

U.S. PATENT DOCUMENTS

| 1,346,245 A | 7/1920 | Palosky |
| 2,284,982 A | 6/1942 | Miller |

(Continued)

FOREIGN PATENT DOCUMENTS

| DE | 471 910 C | 2/1929 |
| DE | 32 37 325 C2 | 4/1984 |

(Continued)

OTHER PUBLICATIONS

International Search Report of PCT/DE2012/000266, Jun. 28, 2012.
(Continued)

*Primary Examiner* — David B Thomas
(74) *Attorney, Agent, or Firm* — Collard & Roe, P.C.

(57) ABSTRACT

A power screwdriver overload prevention means (100), which is arranged between an input drive part (110) and an output drive part (102, 121) and which interrupts the transmission of torque between the input drive part (110) and the output drive part (102, 121) when a threshold torque is exceeded, is characterized in that the input drive part (110) has at least one ring of balls (130) that is arranged in a rotationally fixed manner in the input drive part, in that the output drive part (102, 121) has at least one ring of balls (140; 141, 142) that is arranged in a rotationally fixed manner in the output drive part (102, 121), and in that the ring of balls (130) that is arranged in the input drive part (110) is spring-preloaded via the ring of balls (140; 141, 142) arranged in the output drive part (102, 121) such that the balls (130) of the input drive part (110) are located in each case between two balls (140; 141, 142) of the output drive part (102, 121) and thus transmit a torque, and such that, when the threshold torque is exceeded, the balls (130) of the input drive part (110) roll over the balls (140; 141, 142) of the output drive part (102, 121) and thus interrupt the transmission of torque.

10 Claims, 6 Drawing Sheets

(51) Int. Cl.
  *F16D 7/02* (2006.01)
  *F16D 7/08* (2006.01)

(56) References Cited

U.S. PATENT DOCUMENTS

| | | | | |
|---|---|---|---|---|
| 3,137,187 | A | * | 6/1964 | Van Hoose .................. 81/474 |
| 3,602,346 | A | * | 8/1971 | Daugherty .................. 192/48.8 |
| 3,662,628 | A | * | 5/1972 | Schnepel .................... 81/474 |
| 3,969,961 | A | | 7/1976 | Amoroso |
| 4,189,961 | A | * | 2/1980 | Yamashita et al. ........... 475/168 |
| 5,048,381 | A | * | 9/1991 | Allen et al. .................. 81/477 |
| 5,437,524 | A | * | 8/1995 | Huang ......................... 408/139 |
| 5,655,421 | A | * | 8/1997 | Haupt .......................... 81/473 |

| | | | |
|---|---|---|---|
| 2013/0180819 | A1 | * 7/2013 | You .......................... 192/56.62 |

FOREIGN PATENT DOCUMENTS

| | | |
|---|---|---|
| DE | 37 38 311 A1 | 6/1988 |
| DE | 198 29 960 A1 | 6/2000 |
| DE | 20 2005 005 513 U1 | 8/2006 |
| DE | 10 2006 050 995 A1 | 5/2008 |

OTHER PUBLICATIONS

English translation of the International Preliminary Report on Patentability and Written Opinion of the International Searching Authority of PCT/DE2012/000266, Sep. 26, 2013.

* cited by examiner

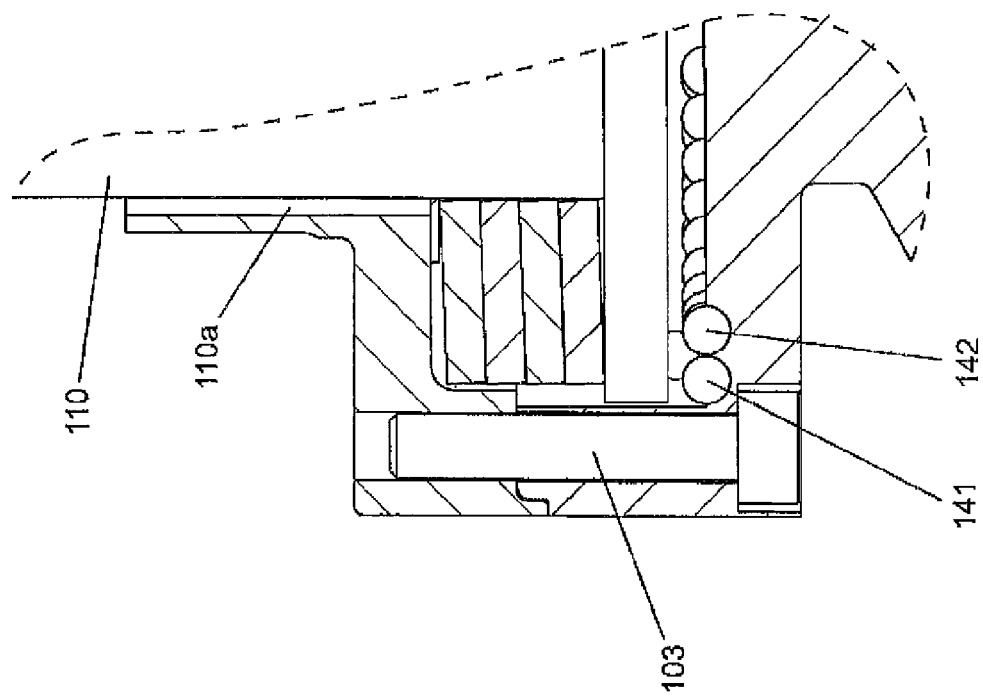

POWER SCREWDRIVER OVERLOAD PREVENTION MEANS

CROSS REFERENCE TO RELATED APPLICATIONS

This application is the National Stage of PCT/DE2012/000266 filed on Mar. 16, 2012, which claims priority under 35 U.S.C. §119 of German Application No. 10 2011 014 357.2 filed on Mar. 17, 2011, the disclosure of which is incorporated by reference. The international application under PCT article 21 (2) was not published is English.

The invention relates to a power screwdriver overload prevention means according to the type of the independent claim 1.

A power screwdriver overload prevention means of the assignee is realized as a slip clutch acting between a drive part and an output drive part, which interrupts the transmission of torque between the drive part of the output drive part upon exceeding a threshold torque and in which at least one separate friction ring is provided. This power screwdriver overload prevention means is destruction-free, so that after the response of the power screwdriver overload prevention means the work can be continued with the power screwdriver without any further measures. The separate friction ring allows predetermining a defined friction, thus ensuring reproducible repeatability of the threshold torque.

DESCRIPTION OF THE PRIOR ART

An overload prevention means for torque multipliers is also disclosed in DE 32 37 325 C2. In this overload prevention means, two spur-cut gearwheels are provided which are arranged in a power flow path, are held under normal load by means of spring in positive and non-positive engagement, and slip above one another in a destruction-free manner under overload. This overload prevention means is also destruction-free, but the gearwheels are subjected to considerable wear and tear under very high torques, thereby reducing the operational lifespan of such an overload prevention means.

U.S. Pat. No. 5,437,524 discloses a torque limiting device, in which balls arranged at specific locations cooperate with respective recesses arranged in a disc, the balls are pressed out of the recess upon exceeding a threshold torque and thereby the transmission of torque is interrupted upon exceeding the threshold torque. It is problematic in this device that the balls are pressed out of respective receivers of a disc. This can lead to damage of the ball receivers and in the end to damage of the disc which render the device inoperable. Furthermore, radial bearing of the shafts needs to be provided in this device, which allows sufficient bearing of the drive and output shaft especially when the threshold torque is exceeded.

A torque-limiting device is known from DE 198 29 960 C2, which is used especially in wrenches or screwdrivers which are actuated manually or mechanically and which are rotatable about a rotational axis. The transmission of torque occurs in this respect by drivers in form of balls which mesh in rolling contact above one another. The balls are situated in the axial boreholes of stacked plates. In this device too, bearing of the two shafts in the radial direction is mandatory. This may be problematic especially in the transmission of very high torques and in this case upon exceeding a very high threshold torque.

Further torque limiting devices are known from U.S. Pat. No. 3,969,961 and DE 20 2005 005 513 U1. Overload clutches are further known from DE 37 38 311 A1 and DE 10 2006 050 995 A1.

All these devices respectively require precise bearing of the shafts in the radial direction.

The invention is based on the object of further developing a power screwdriver overload prevention means of the generic type in such a way that a destruction-free and virtually wear-proof torque interruption under overload can be realized in a precisely repeatable manner and with precise values even under high torques. It is especially also possible to realize the transmission of torque by avoiding the radial bearing of at least one shaft.

DISCLOSURE OF THE INVENTION

Advantages of the Invention

This object is achieved by a power screwdriver overload prevention means of the kind mentioned above by the features of the independent claim 1.

It is the fundamental idea of a first solution in accordance with the invention to realize the overload prevention means by a ring of balls which is arranged in a torsion-proof manner in the input drive part and a ring of balls which is opposite thereto and is arranged in a torsion-proof manner in the output drive part, wherein the two rings of balls are under spring preloading and the balls of the drive ring are respectively disposed between two balls of the output ring and thus transmit a torque. When the threshold torque is exceeded, the balls of the drive part roll or slide against the spring force over the balls of the output drive part and thus interrupt the transmission of torque.

A relevant feature of the solution in accordance with the invention is that a radial bearing of the drive shaft on its side facing away from the output shaft can be avoided.

The considerable advantage of the two mutually engaging rings of balls is that it is not only possible to transmit a high torque, but that such an arrangement is virtually free from wear and tear because the balls of the ring of the input drive part will roll off or slide along the balls of the ring of the output shaft upon exceeding the threshold torque. An axial alignment of the shafts is realized simultaneously.

As a result of the measures mentioned in the claims referring back to claim 1, advantageous further developments and improvements are possible for the power screwdriver overload prevention means provided in claim 1.

An advantageous embodiment thus provides that the input drive part comprises a disc with ball receivers arranged therein in a circular manner, in which the balls of the input drive part are arranged.

It is further preferably provided that the output drive part also comprises a disc with ball receivers arranged therein in a circular manner, in which the balls of the output drive part are arranged.

It is preferably provided that the ball receivers are respectively arranged in such a deep way that the balls are accommodated therein in a deeper manner than mutually opposite balls will engage into each other, especially that at least one hemisphere is arranged therein. Such an arrangement offers the advantage that the balls are held and guided in a secure manner in the discs of the input drive part or output drive part. This ensures that even when a high torque is exerted it is not possible to move any ball out of its receiver. Instead, secure rolling/sliding of the balls forming the respective rings on each other is ensured.

An especially preferred embodiment provides that two rings of balls situated concentrically in each other are situated opposite on the output or drive side to a ring of balls on the drive or output side in such a way that the balls of the ring of balls on the drive or output side are arranged between the concentric rings. Such an arrangement especially offers the considerable advantage that in addition to torque overload prevention it also offers axial guidance of the input drive part on the output drive part and vice versa. This axial guidance or alignment of the drive part on the output drive part even allows avoiding a radial bearing of the input drive part on the drive side. Instead, it is realized by co-operation of the balls, which are used for precise axial alignment of the input drive part on the output drive part and vice versa.

Spring preloading can principally be realized in different ways. An advantageous embodiment provides that the spring preloading can be produced by a disc spring arranged above the disc of the drive ring. Very high forces can be produced with such a disc spring.

It is provided with respect to compact configuration and simple mounting that the power screwdriver overload prevention means comprises a housing which accommodates the input drive part, the output drive part, the oppositely disposed rings of balls and at least one disc spring in such a way that the disc with the ball receiver of the drive part is preloaded by interposing the balls against the disc with the ball receivers of the output drive part by the disc spring resting on a housing wall.

A second solution in accordance with the invention provides the following configuration of the power screwdriver overload prevention means: the output drive part comprises a friction face on which a sliding disc is arranged, a first pressure disc which is connected to the input drive part rests on the sliding disc, a further sliding ring is arranged on the side of the pressure disc facing away from the output drive part, a further second pressure disc follows the further sliding ring, which second pressure disc exerts a pressure acting in the axial direction on the second sliding disc, the first pressure disc and the first sliding disc. Such a configuration reliably transmits a torque up to a threshold torque which can be preset by choosing the size of the sliding discs, the size of the pressure discs and the material of the sliding and pressure discs and by choosing the pressing force with which the second pressure disc presses on the arrangement consisting of the first sliding disc, first pressure disc and second sliding disc. In the event that the preset threshold torque is exceeded, the sliding discs will slide between the pressure discs, so that the transmission of torque is interrupted. This sliding produces a far from inconsiderable level of noise which indicates to the operator that the tightening torque has been reached.

The sliding discs preferably consist of metal, especially a metal alloy and more preferably a brass alloy. A highly advantageous embodiment provides that the second pressure disc simultaneously forms a housing part which is connected to the output drive part by a plurality of screwed connections; which output drive part is also arranged as a second housing part. These screwed connections and especially their tightening torque determine the pressure with which the arrangement of sliding discs and pressing discs will press against each other. They are therefore also relevant for presetting the tightening torque and the threshold torque.

It is advantageously provided concerning the arrangement of the input drive part in the two solutions in accordance with the invention that the input drive part comprises a receiver, especially a square for a power screwdriver or a torque wrench.

The output drive part preferably comprises a connection element for a screw nut. It can further be provided that the output drive part is coupled to one or several planetary gears in order to thus enable torque multiplication. In this case, an output drive element such as a gear wheel will then be provided at the end of the planetary gear for example.

The power screwdriver overload prevention means is advantageously arranged in a two-part housing. Such a two-part housing not only facilitates mounting but is also highly advantageous concerning later repair and maintenance because the housing can be opened easily and individual parts can be dismounted and exchanged for example.

Preferably, the two housing parts are screwed together, wherein this screwed connection is simultaneously relevant for setting the threshold torque in the case of the second solution in accordance with the invention.

BRIEF DESCRIPTIONS OF THE DRAWINGS

Embodiments of the invention are shown in the drawings and will be explained below in closer detail by reference to the description, wherein:

FIG. 3a shows an enlarged sectional view of FIG. 3;

DETAILED DESCRIPTION OF THE PREFERRED EMBODIMENTS

Figure 1:
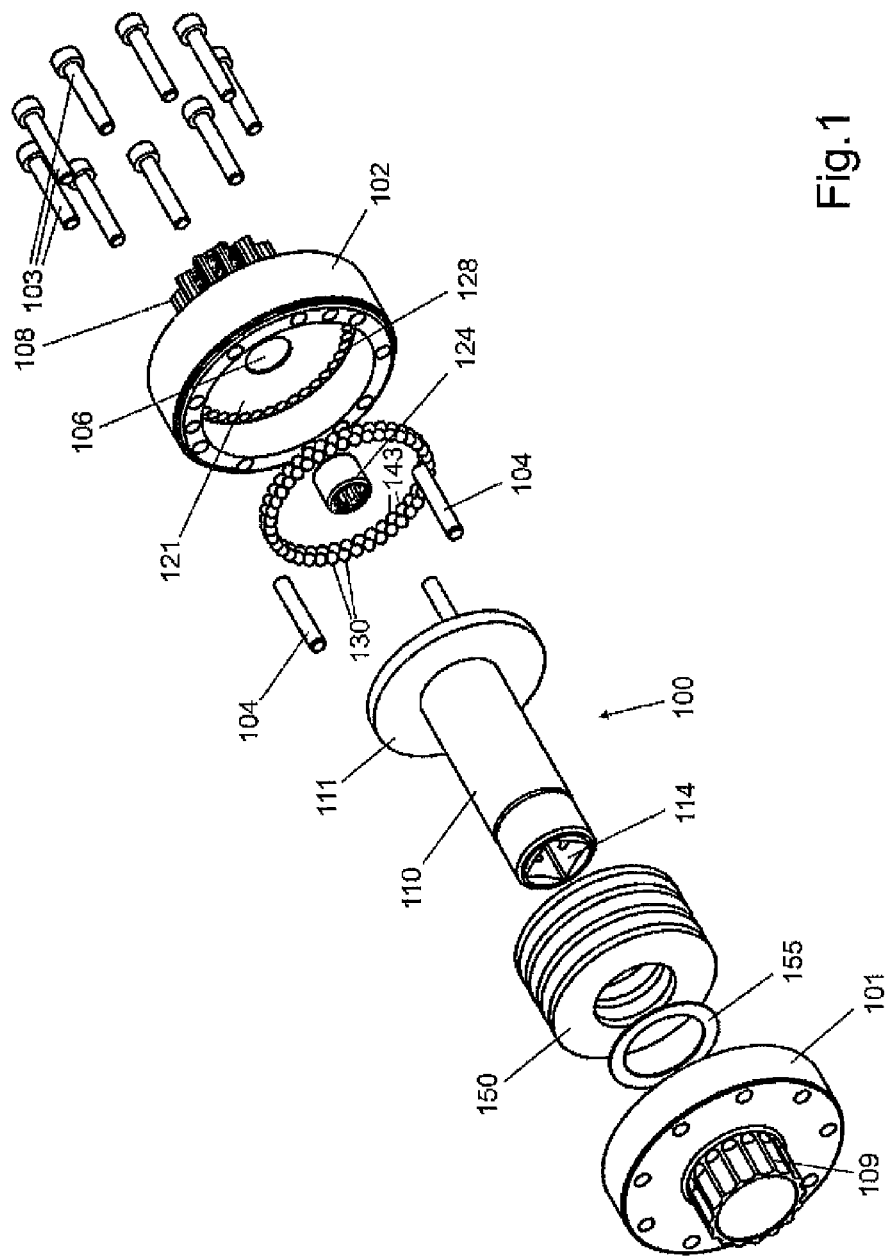
FIG. 1 shows an isometric exploded view of a power screwdriver overload prevention means in accordance with the invention.

A power screwdriver overload prevention means, which is designated in its entirety with the reference numeral 100, comprises a first housing part 101 and a second housing part 102, which can be connected to each other by screwed connections by means of screws 103 which engage into threads provided in the first housing part 101. Cylindrical pins 104 are arranged for this purpose at different angular distances for preventing twisting, which pins engage in respective openings.

An external gearing 109 is arranged in a torsion-proof manner on the first housing part 101 in order to enable the arrangement of further elements in the known manner such as a reverse-lock. The housing part 102 comprises an output drive element 108 such as a gearwheel. Notice must be taken that the housing part 102 represents the output drive part and can also be part of a planetary gear for example which is used for speed transformation and therefore torque multiplication in the known manner.

A bearing receiver 124 is arranged in the second housing part 102 for example in an opening 106 concentric to the housing axis, which will be explained below.

An input drive part 110 is arranged in this housing, which comprises a square 114 at its end accessible from the outside of the housing. The input drive part 110 is arranged in a substantially cylindrical manner and is especially integrally connected to a disc 111, in which ball receivers (not shown in FIG. 1) for balls 130 on the input drive side are provided. Balls 140 on the output drive side are arranged opposite of the balls 130 on the input drive side, which output-side balls are arranged on their part in ball receivers 128 in a disc 121 which is arranged in a torsion-proof manner with the second housing part 102.

The ball receivers 128 and the ball receivers which are respectively arranged and are not shown in FIG. 1 are provided with such a deep arrangement that the balls 130, 140 will protrude at least to such an extent into the ball receivers that at least one hemisphere is housed therein.

Figure 2:
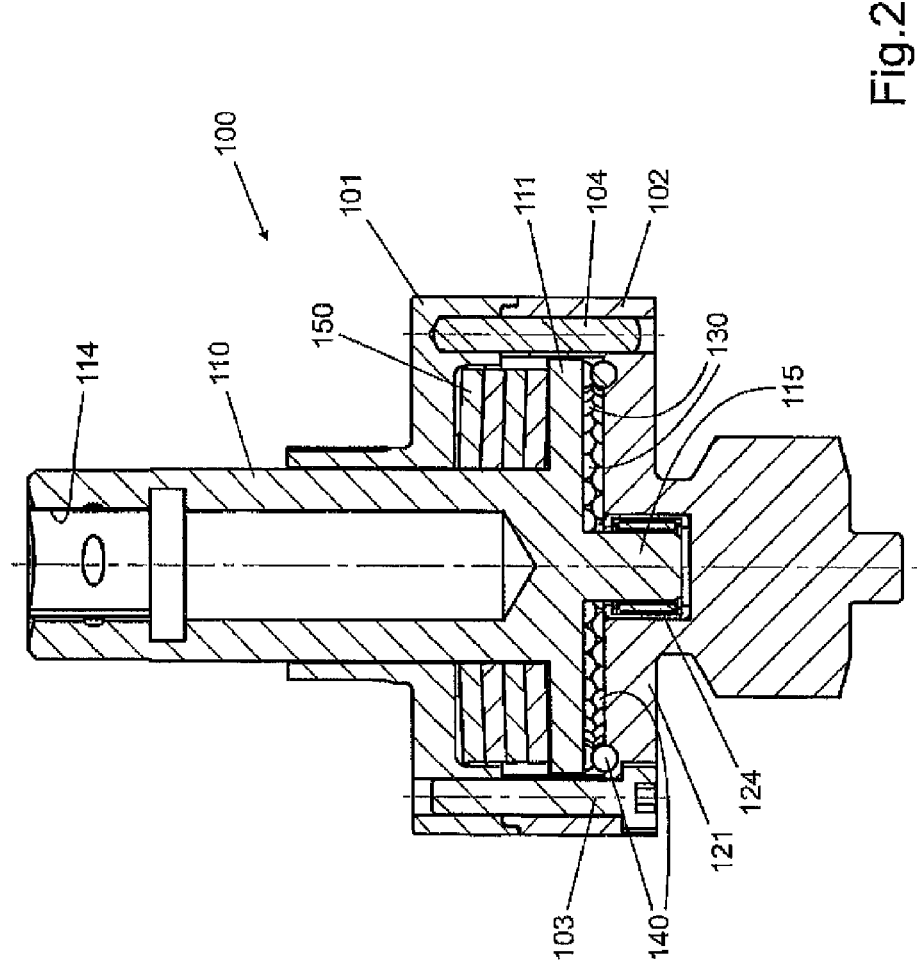
FIG. 2 shows a sectional view of the power screwdriver overload prevention means in the mounted state.

The input drive part 110 is pressed by one or several disc springs 150, which rest on the one hand on the upper side of the disc 111 and on the other hand on the first housing part 101 by interposing a shim 155, against the second housing part, which is simultaneously also the output drive part 102, and the disc 121 by interposing the ball 130, 140. The shim 155 can also be supplemented or replaced by an axial bearing (not shown). This mounted state is shown in FIG. 2 in a sectional view. The balls 130 and 140 lie above one another in such a way that the balls 130 are respectively arranged in the intermediate spaces of the balls 140 and vice versa, i.e. substantially offset by a radius. The balls 130, 140 have the same radius.

The balls 130, 140 engage into each other under preloading, which is exerted by the disc spring 150 which rests on the housing wall of the housing part 101 and simultaneously rests on the upper side of the disc 111, which forms the ball receiver for the balls 130 on the drive side. The disc spring 150 exerts a very high force on the balls 130, 140.

In the usual screwing case, i.e. when the threshold torque is not exceeded, the balls 130 engage in the balls 140 in the manner as described above and will entrain the output drive part 102 during a drive the input drive part 110. When the threshold torque is exceeded, which can be set and determined especially by the spring constant of the disc spring 150, the balls 130 of the drive part will roll off over the balls 140 of the output drive part, thus compressing the spring in the direction of the square 114 and interrupting the transmission of torque in this manner, in that the balls 130 will roll off over the balls 140 and thus virtually "jump" from intermediate space to intermediate space.

As is further shown in FIG. 2, a bearing receiver 124 (also see FIG. 1) is arranged in the second housing part which is equivalent to the output drive part 102, in which a pin 115 of the input drive part 110 will engage. This bearing is used for axial stabilization of the input drive part 110 on the output drive part 102.

Figure 3:
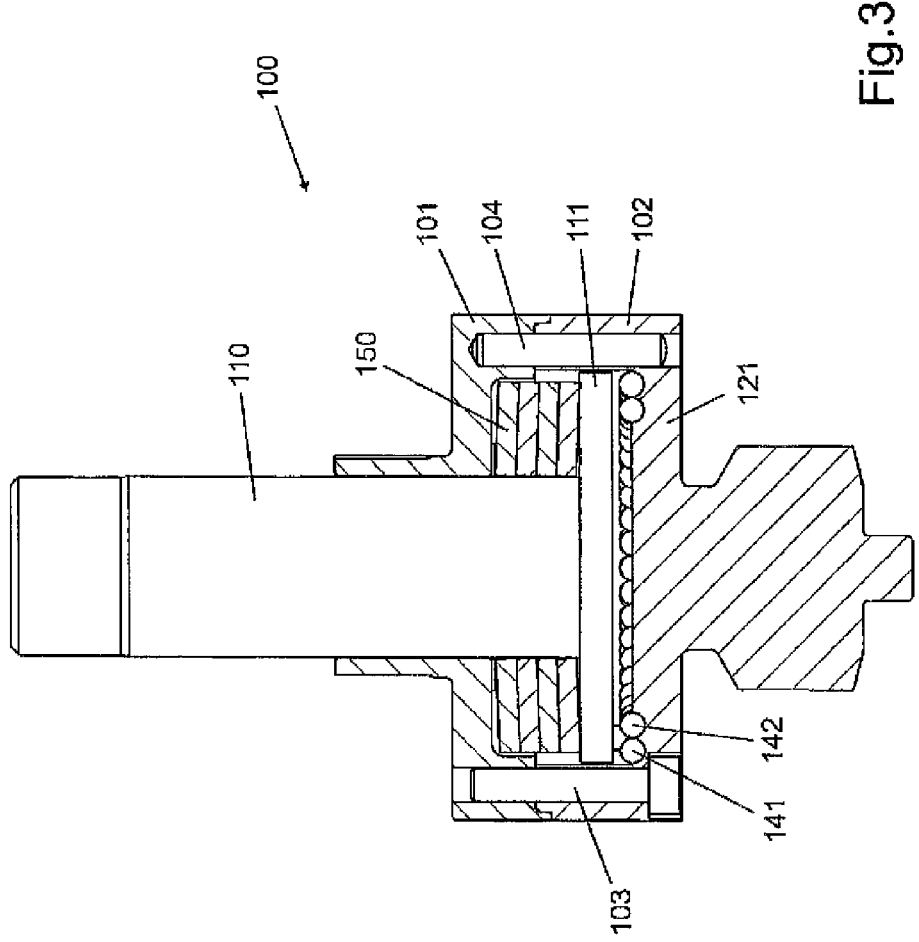
FIG. 3 shows a sectional view of another embodiment of the power screwdriver overload prevention means in the mounted state.

Such stabilization is not necessary in another, highly advantageous embodiment shown in FIG. 3. In this case, two receiving rings for balls 141 and 142 which are arranged concentrically in each other are provided in the output drive part 102, i.e. in the disc 121. The balls 130 of the drive part 110, which have been omitted in FIG. 3 for reasons of clarity of the illustration, engage into these balls 141, 142, wherein the balls 130 come to lie between the two concentric rings and are respectively simultaneously also arranged between the balls 141 of the first ring and the balls 142 of the second ring. When the threshold torque is exceeded, the balls 130 respectively jump between the adjacent balls 141 of the outer ring and simultaneously between the adjacent balls 142 of the inner ring in the manner as described above, wherein they always come to line between the concentric rings. The two rings of balls realize axial stabilization of the input drive part 110 on the output drive part 102, wherein especially an axial alignment of the input drive part 110 relative to the output drive part 102 can be realized in the axial direction also as a result of this arrangement in conjunction with the spring force. FIG. 3*a* shows in an enlarged view that a radial bearing of the input drive part 110 on the drive side is not necessary. Instead, the radial alignment of the drive part 110 is realized by the co-operation of the rings of balls and their arrangement. An empty space 110*a* is situated between the input drive part 110 and the housing part 101. A radial bearing of the drive part 110 can be avoided. In contrast to the solutions known from the state of the art, the solution in accordance with the invention can completely avoid radial bearing on the drive side.

The aforementioned overload prevention means comes with the advantage that it not only allows the transmission of high torques, but also that it operates with very little wear and tear.

Figure 4:
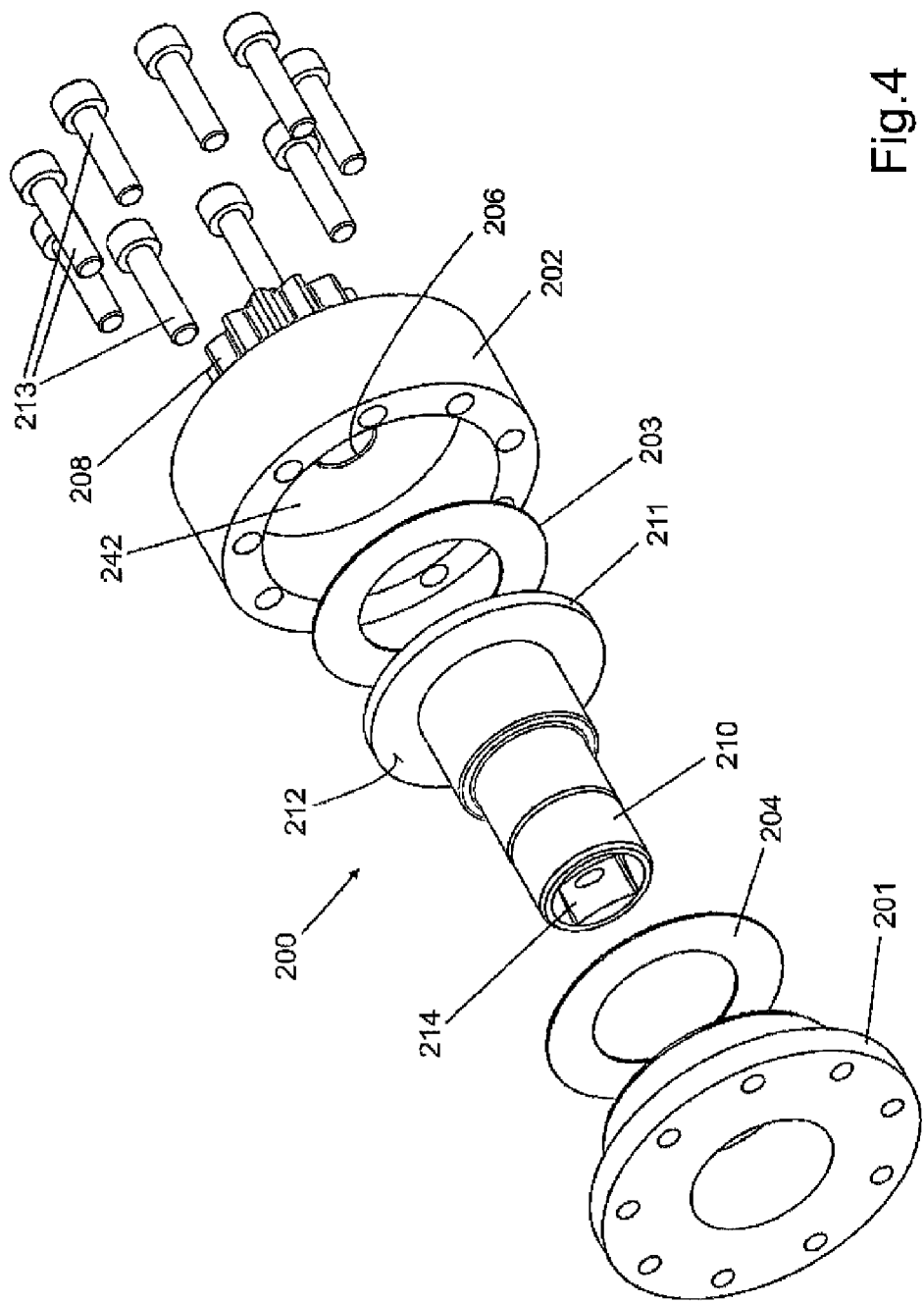
FIG. 4 shows an isometric exploded view of a further power screwdriver overload prevention means in accordance with the invention.
Figure 5:
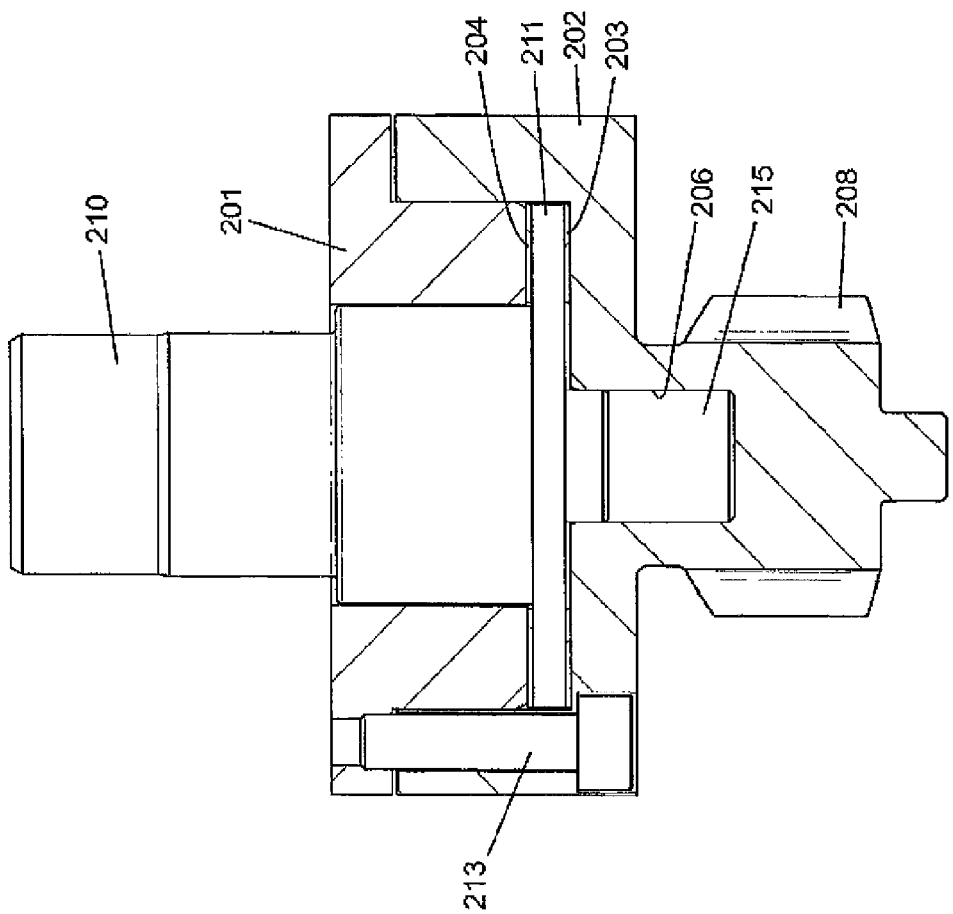
FIG. 5 shows a sectional view of the power screwdriver overload prevention means as shown in FIG. 4.

A further power screwdriver overload prevention means according to the invention is shown in FIGS. 4 and 5. Such a power screwdriver overload prevention means, which is designated in its entirety with reference numeral 200, comprises the following arrangement in the axial direction:

A receiver 242 for a first sliding disc 203 is arranged in a first output drive part 202, which can simultaneously be part of a planetary gear as already mentioned above. The receiver has a flat surface on which the sliding disc 203 comes to lie. The sliding disc 203 is followed by a first pressure disc 211, which acts on the sliding disc 203 in the mounted state of the power screwdriver overload prevention means under exertion of a force. Said first pressure disc 211 is preferably integrally connected to an input drive part 210. A bearing surface 212 is also arranged on the side of the first pressure disc 211 which faces away from the first sliding disc 203, on which bearing surface a second sliding disc 204 comes to lie. A second pressure disc 201 presses against the second sliding disc 204. The second pressure disc 201 is connected in a torsion-proof manner via screwed connections 213 to the output drive part 202. The drive part 210 is rotatably mounted in this arrangement, wherein a pin 215 of the drive part 210 engages in an opening 206 in the output drive part 202, as shown especially in FIG. 5. Pivot bearings can also be provided. This arrangement is used for radial guidance of the input drive part 210.

The drive part 210 comprises a square 214, into which a torque wrench or a power screwdriver or the like engages for example. An output drive element 208 such as a gearwheel is arranged on the output drive part 202. The second pressure disc 201 and the output drive part 202 simultaneously also form two housing halves of the housing of the power screwdriver overload prevention means 200.

The function of this power screwdriver overload prevention means 200 is the following. Up to a specific threshold torque, which is adjustable by the properties, especially the dimensions (diameter) of the sliding discs 203, 204, the pressure discs 211, 201, the materials of the sliding discs 203, 204, the pressure discs 211, 201, the materials of the sliding discs 203, 204 and the pressure discs 211, 201, as well as the tightening torque of the screws 213, the output drive part 202 and, in combination with said part, the output drive element 208 are made to rotate during a rotation of the drive part 210, wherein—as already mentioned—the output drive part 202 can be part of a planetary gear. Once the threshold torque has been exceeded, a sliding movement of the input drive part 210 occurs relative to the output drive part 202, i.e. the drive part 210 will "spin", wherein this is linked to a considerable development of noise. The sliding movement of the input drive part 210 relative to the output drive part 202 occurs in the following manner when the threshold torque is exceeded, several variants of sliding of the various components on each other can occur. There can respectively be a sliding motion between the first sliding disc 203 and the output drive element 202, or between the first sliding disc 203 and the first pressure disc 211, or between the first pressure disc 211 and the second sliding disc 204, or between the second sliding disc 204 and the second pressure disc 201. This means in other words that the sliding discs can slide on their two sides as seen in the axial direction and thus interrupt the transmission of torque.

The arrangement comes with the advantage that in the case of wear and tear of the sliding discs 203, 204 they can easily be exchanged. Furthermore, the sliding discs 203, 204 are subject to a substantially lower level of wear and tear than spur-cut gearwheels, as known from the state of the art.

The invention claimed is:

1. A power screwdriver overload prevention device, which is arranged between an input drive part and an output drive part and which interrupts the transmission of torque between the input drive part and the output drive part when a threshold torque is exceeded, wherein the input drive part comprises at least one ring of balls which is arranged in a torsion-proof manner in the input drive part, the output drive part comprises at least one ring of balls which is arranged in a torsion-proof manner in the output drive part, and the ring of balls which is arranged in the input drive part lies in a spring-preloaded manner above the ring of balls arranged in the output drive part in such a way that the balls of the input drive part are respectively located between two balls of the output drive part and thus transmit a torque, and when the threshold torque is exceeded the balls of the input drive part roll over the balls of the output drive part and thus interrupt the transmission of torque,
  wherein two rings of balls on the output drive side or input drive side which are concentrically located inside each other are situated opposite a ring of balls on the output drive side or input drive side in such a way that the balls of the ring of balls on the input drive side or output drive side are situated between the concentric rings, and
  wherein an axial alignment of the input drive part on the output drive part can be realized by avoiding a radial bearing in that the balls of the ring of balls on the input drive side or output drive side are situated between the concentric rings.

2. A power screwdriver overload prevention device according to claim 1, wherein the input drive part comprises a disc with ball receivers circularly arranged therein, in which the balls of the input drive part are arranged.

3. A power screwdriver overload prevention device according to claim 2, wherein the ball receivers are provided with such a deep configuration that at least one respective hemisphere can be accommodated therein.

4. A power screwdriver overload prevention device according to claim 1, wherein the output drive part comprises a disc with ball receivers circularly arranged therein, in which the balls of the output drive part are arranged.

5. A power screwdriver overload prevention device according to claim 4, wherein the input drive part, the output drive part, the mutually opposite rings of balls and a disc spring are arranged in the housing in such a way that the disc with the ball receivers of the input drive part is preloaded, with interposing of the balls, by the disc spring resting on a housing wall against the disc with the balls receivers of the output drive part.

6. A power screwdriver overload prevention device according to claim 1, wherein the spring preloading is produced by at least one disc spring arranged above the disc of the input drive ring.

7. A power screwdriver overload prevention device according to claim 1, wherein the drive part comprises a receiver, especially a square, for a power screwdriver or a torque wrench.

8. A power screwdriver overload prevention device according to claim 1, wherein the output drive part comprises a connection element.

9. A power screwdriver overload prevention device according to claim 1, wherein it is arranged in a two-part housing.

10. A power screwdriver overload prevention device according to claim 9, wherein the two housing parts are screwed together.

* * * * *